(12) United States Patent
Bell et al.

(10) Patent No.: US 9,665,924 B2
(45) Date of Patent: May 30, 2017

(54) PRIORITIZED REQUESTING OF MAPPING LAYERS

(71) Applicant: Microsoft Technology Licensing, LLC, Redmond, WA (US)

(72) Inventors: Andrew Bell, Seattle, WA (US); Dvir Horovitz, Redmond, WA (US); Sudhakar Pitchumani, Issaquah, WA (US); Srinivas Kanakapally, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/676,591

(22) Filed: Apr. 1, 2015

(65) Prior Publication Data
US 2016/0292815 A1 Oct. 6, 2016

(51) Int. Cl.
| | |
|---|---|
| *G01C 21/00* | (2006.01) |
| *G06T 1/60* | (2006.01) |
| *G06T 1/20* | (2006.01) |
| *G06T 17/05* | (2011.01) |
| *G06F 17/30* | (2006.01) |

(52) U.S. Cl.
CPC ............ *G06T 1/60* (2013.01); *G01C 21/005* (2013.01); *G06F 17/30241* (2013.01); *G06F 17/30902* (2013.01); *G06T 1/20* (2013.01); *G06T 17/05* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 6,847,647 B1 * | 1/2005 | Wrenn | H04L 45/24 370/392 |
| 7,010,567 B1 * | 3/2006 | Mori | G01C 21/32 340/995.18 |
| 7,933,897 B2 | 4/2011 | Jones et al. | |
| 8,219,318 B2 | 7/2012 | Kreft | |
| 8,411,113 B1 | 4/2013 | Cornell et al. | |
| 8,744,753 B2 | 6/2014 | Coch et al. | |
| 8,792,916 B2 | 7/2014 | Dicke | |
| 9,063,951 B1 * | 6/2015 | Zhu | G06F 17/30241 |
| 2003/0231190 A1 | 12/2003 | Jawerth et al. | |

(Continued)

FOREIGN PATENT DOCUMENTS

| | | |
|---|---|---|
| CN | 103020250 A | 4/2013 |
| EP | 0814613 A1 | 12/1997 |

OTHER PUBLICATIONS

"Organize Map Content with Layers", Published on: Sep. 24, 2014 Available at: https://support.google.com/mymaps/answer/3024933?hl=en.

(Continued)

*Primary Examiner* — Joni Richer
(74) *Attorney, Agent, or Firm* — Holzer Patel Drennan

(57) ABSTRACT

A mapping system disclosed herein includes a requestor that transmits requests for different layer sets of mapping data for a digital map to one or more data sources across a network according to a predefined order. According to one implementation, the mapping system also processes and/or renders the different layer sets to a display according to the predefined order.

23 Claims, 9 Drawing Sheets

(56) References Cited

U.S. PATENT DOCUMENTS

| | | |
|---|---|---|
| 2007/0233369 A1* | 10/2007 | Ng .................. G01C 21/26 |
| | | 701/532 |
| 2008/0059889 A1 | 3/2008 | Parker et al. |
| 2009/0003270 A1 | 1/2009 | Schwenke et al. |
| 2010/0223551 A1 | 9/2010 | Twig et al. |
| 2011/0063301 A1 | 3/2011 | Setlur et al. |
| 2012/0271848 A1 | 10/2012 | Kadowaki et al. |
| 2013/0342545 A1 | 12/2013 | Appleton et al. |
| 2014/0204085 A1 | 7/2014 | Stroila |

OTHER PUBLICATIONS

Taylor, Frank, "Google Earth Layers", Published on: Mar. 22, 2009 Available at: http://www.gearthblog.com/blog/archives/2009/03/google_earth_layers_1.html.

"A Quick Tour of Map Layers", Retrieved on: Jan. 23, 2015 Available at: http://resources.arcgis.com/en/help/main/10.1/index.html#//00s500000015000000.

"International Search Report and Written Opinion Issued in PCT Application No. PCT/US2016/025104", Mailed Date: Jul. 4, 2016, 10 Pages.

"Second Written Opinion Issued in PCT Application No. PCT/US2016/025104", Mailed Date: Feb. 17, 2017, 6 Pages.

* cited by examiner

PRIORITIZED REQUESTING OF MAPPING LAYERS

BACKGROUND

Rendering mapping data to a user display can be computationally demanding. On some user platforms, graphics and text of a mapped area may not be displayed in a useful manner, or at all, for a delayed period of time after initiation of a mapping request. These delays in rendering of mapping data are due, in part, to the fact that data may be retrieved from a variety of different sources and/or in a variety of different data formats. Requests to many different data sources (e.g., different databases for geography data, road data, mountain data, water data, etc.), can congest available data channels. Further, different types of mapping data may be retrieved in different formats (e.g., image data, vector data, etc.) that are not combinable without substantial processing.

SUMMARY

Implementations described herein present mapping data in a user display by progressively requesting, processing, and/or rendering different layer sets of mapping data according to a predefined order. According to one implementation, a system includes a requestor stored in memory and executable by at least one processor. The requestor transmits requests for different layer sets of mapping data according to a predefined order.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTION

Responsive to a user request, a mapping product may retrieve different "layer sets" of mapping data from one or more data sources to generate a map of an area of user interest. As used herein, a "layer set" of mapping data generally refers to mapping features of a same data type and/or described by a common type of geographical feature. Examples of layers of mapping data include without limitation: water features, land features, roads and transportation routes, labels, elevation data (e.g., isolines), topography (e.g., hill-shading), current traffic data, etc.

In some implementations, mapping products request data via non-prioritized database queries and render data to a display in an order that the data is received from the databases. These types of non-prioritized queries contribute to considerable delays between a time that a mapping request is initialized and a time that a user is first presented with useful data. For example, a user interested in retrieving highway driving directions may, in some cases, have to wait for hill-shading of a mountain range to render before being presented with any imagery pertaining to roads or highways. Excessive wait time between a mapping request and display of data that is "important" to the user may inconvenience the user and create the impression that the mapping product is slow.

According to one implementation, the disclosed technology provides a mapping tool that renders different layer sets of mapping data to a display according to a defined priority and/or according to one or more threshold conditions. In another implementation, the mapping tool also requests the different layers sets of mapping data from one or more data sources across a network according to the defined priority and/or processes the data according to the defined priority. The mapping tool allows a user to be presented with data that is more likely to be relevant to a central purpose of a mapping request before the user is presented with data that is less relevant to the central purpose (e.g., less useful). In effect, the system presents a user with more relevant information more quickly and in a more logical manner than other mapping systems, subjecting the user to less apparent delay time and providing the user with an overall experience that is more enjoyable and convenient.

Figure 1:
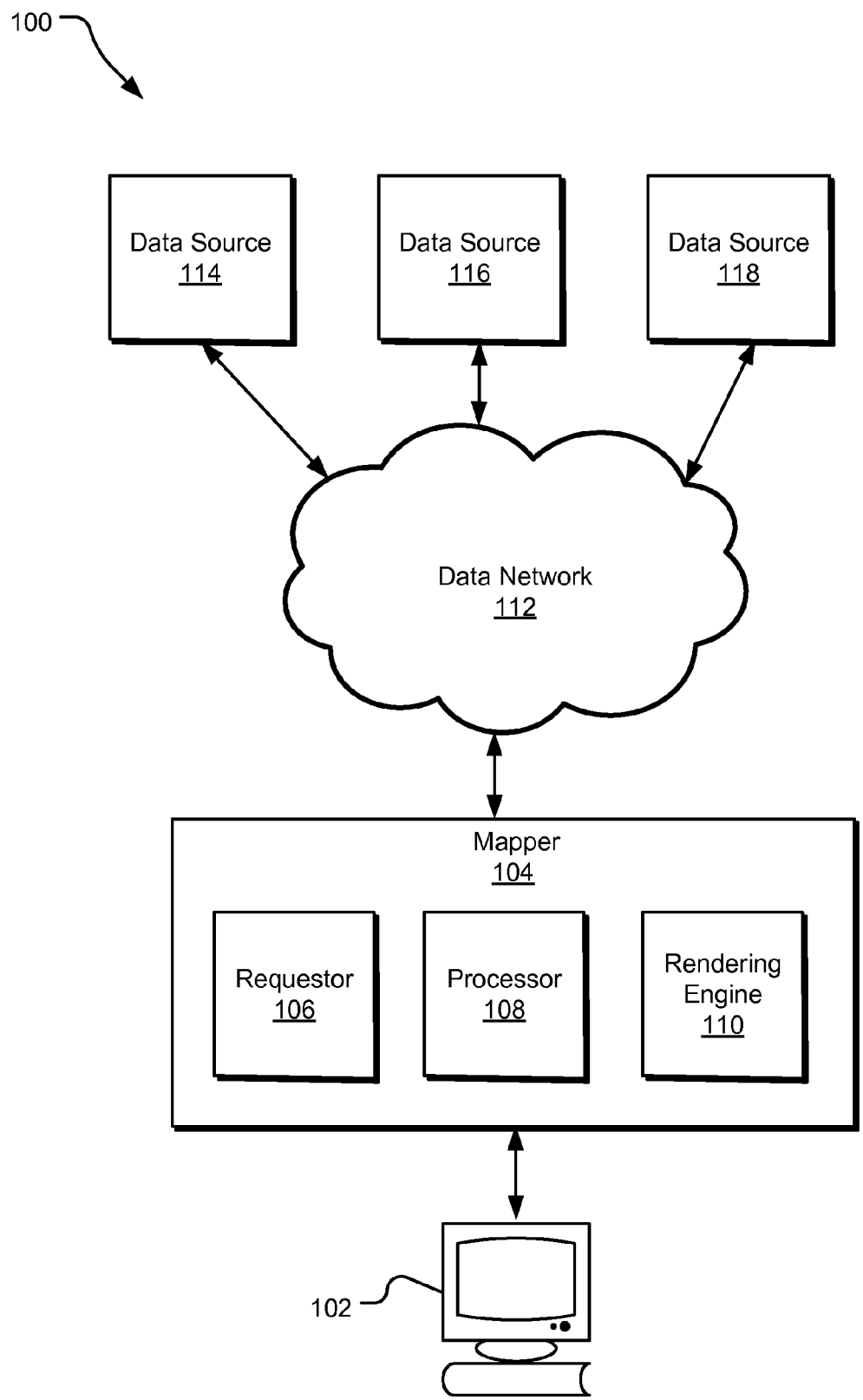
FIG. 1 illustrates an example mapping system for progressive requesting and/or rendering of different layer sets of mapping data according to a layer prioritization scheme.

FIG. 1 illustrates an example mapping system 100 for progressive requesting and/or rendering of different layer sets of mapping data according to a layer prioritization scheme. The mapping system 100 includes at least one user device 102 and a mapper 104 for presenting mapping data to a user via a display screen of the user device 102. In various implementations, the mapper 104 may be hardware and/or software stored in memory of the user device 102 or accessible by a processor of the user device 102. The user provides data input to the user device 102 and the interactive mapper 104 interprets the input to define parameters (e.g., latitude/longitude boundaries) defining a geographical area of interest. For example, a user may provide input by one or more of a keypad, touch screen, touch pad, microphone (voice input), image sensors, etc. The user device 102 may be one or more of a variety of electronic devices capable of sending and receiving data across a data network 112 including without limitation: a desktop or laptop computer, tablet, mobile device, gaming system, smart phone, etc.

In FIG. 1, the mapper 104 includes a requestor 106, a processor 108, and a rendering engine 110. Each of the requestor 106, processor 108, and the rendering engine 110 may include hardware and/or software elements, such as software elements stored in memory and executed by a processor of the user device 102.

The requestor 106 generates a series of database queries to retrieve mapping features corresponding to an area within the defined geographical area of interest. In one implementation, different layer sets of mapping data are prioritized via a layer prioritization scheme, and database queries for the different layer sets are transmitted in an order of priority defined by the layer prioritization scheme. The requestor 106 generates and/or sorts the database queries for the different layer sets of mapping data according to the layer prioritization scheme so that queries pertaining to a highest-priority layer are transmitted first; queries pertaining to a second-highest priority layer are transmitted second; queries pertaining to a third-highest priority layer are transmitted third, and so on.

The layer prioritization scheme prioritizes various layers of mapping data according to one or more predefined criteria. In one implementation, the various layers of mapping data are prioritized based on a presumed "purpose" of a user query. For example, a primary (e.g., most common) purpose of the mapper 104 may be provide users with driving directions; a secondary (e.g., second most common) purpose of the mapper 104 may be to provide users with traffic data; and a tertiary purpose of the mapper 104 may to provide users with reference images of geographic features or jurisdictional boundaries pertaining to an area of interest. To facilitate rendering of mapping data in accord with these purposes, the layer prioritization scheme may specify that the following layer sets are to be treated with the following order of priority: (1) roads; (2) traffic data; (3) water and/or other geographic features; (4) jurisdictional boundaries; and (5) all other layers.

In still other implementations, the layer prioritization scheme prioritizes different layers of data based on other criteria, such as speed of expected data return, quantity of data requested in each different layer, etc. If, for example, the layer prioritization scheme prioritizes different layer sets based on speed of expected data return, layer sets associated with a high speed of expected data return may be prioritized above layer sets associated with a low speed of expected data return. In this case, initially-returned layer sets can be more immediately rendered to a display, reducing an amount of time that a user spends waiting for initial data presentation.

If, on the other hand, the layer prioritization scheme prioritizes different layer sets based on a quantity of data requested in each layer set, layer sets including larger quantities of data may be requested and rendered first so that more data is presented to the user initially, with smaller amounts filling in upon receipt of subsequently-requested layer sets.

In still other implementations, the layer prioritization scheme employs a balance between speed of expected data return and relative value of each of the layer sets. For example, the layer prioritization scheme may be based on the assumption that it is better to request and render two medium value layer sets quickly before a slow, high value layer set in order to provide the user with a sense of progress. In yet other implementations, the layer prioritization scheme dictates requesting and/or rendering of the highest value layer sets first, even if progress appears slow.

In some implementations, the layer prioritization scheme is dynamically determined. For example, the layer prioritized scheme may be selected or generated based on user input associated with a mapping request to the mapper 104. If a user specifies a primary purpose of the mapping request, such as "directions", "traffic", "geography," etc., the mapper 104 may select a layer prioritizations scheme (e.g., from a number of preset layer prioritization scheme options) that most highly prioritizes layer set(s) closely associated with the specified "primary purpose." In other implementations, the layer prioritization scheme is predefined. For example, a system controller may statically define a single layer prioritization scheme for uniform application and implementation in various uses of the mapper 104.

The requestor 106 delays transmission of database queries pertaining to each distinct layer of mapping data according to satisfaction of one or more threshold conditions. In one implementation, the requestor 106 does not initiate queries pertaining to data of an "Nth" layer set according to the layer prioritization scheme until some threshold amount of data pertaining to the most-recently requested layer set (e.g., the request for data of the n−1 layer set) is received. For example, the requestor 106 may transmit requests for data pertaining to a highest-priority layer set (e.g., layer set 1) and then postpone all requests for data pertaining to the next-highest priority layer set (e.g., layer set 2) until substantially all of the data of the highest-priority layer set (e.g., layer set 1) is received.

In another implementation, the requestor 106 delays requests pertaining to a particular layer set of mapping data until a defined amount of data of a most recently requested layer set is received. For example, the requestor may transmit a series of requests for water data and postpone all requests for road data until approximately 80% of the water data is received. By delaying requests in this manner, it is ensured that lower-priority requests do not fill up available channels before high-priority data is received. Consequently, the mapper 104 can begin rendering the higher-priority data to the user interface while the lower priority data is still being requested and/or received.

Each individual query is transmitted through the data network 112 to one or more data sources (e.g., data sources 114, 116, and 118) storing information that is publicly or privately available. In some implementations, different respective layer sets of mapping data are stored in different data sources. For example, topography data may be stored as satellite imagery in a first database and water data may be stored as vector data in a second database. As query results are returned to the mapper 104 from the data sources 114, 116, and/or 118, the processor 108 processes the incoming data.

In one implementation, the processor 108 processes the incoming data according to the layer prioritization scheme. For example, the processor 108 processes data of the highest-priority level first, data of the second highest-priority level second, and so on. In the event that data for two or more layers is received out of order (e.g., in an order contrary to the layer prioritization scheme), the processor 108 may delay processing of portions of the incoming data in order to adhere to the layer prioritization scheme. For example, the requestor 106 may request water data before road data and delay the first request for road data until such time that at least 80% of the water data has received. If any of the road data is received before the final 20% of the water data, the processor 108 delays processing of the road data so that all of the requested water data is processed before any of the requested road data is processed.

The rendering engine 110 renders (e.g., displays) the processed mapping data via a display of the user device 102. In one implementation, the rendering engine 110 renders processed mapping data as the mapping data is output (e.g., in real time) from the processor 108. If the processor 108 processes the data according to the layer prioritization scheme (e.g., one layer at a time in a defined order), the rendering engine 110 renders the various layer sets according to the layer prioritization scheme. For example, the rendering engine 110 may begin to render water features on the user interface as the water features are processed by the processor 108. After all water features are rendered, the rendering engine 110 may begin to render processed data of the next highest priority layer (e.g., roads).

The layer prioritization scheme may be applied independently or collectively by any combination of the requestor 106, processor 108, and the rendering engine 110. For example, the requestor 106 may request data according to the layer prioritization scheme regardless of an order in which the data is processed and/or rendered; the processor 108 may selectively process the mapping data according to the layer prioritization scheme regardless of an order in which the data is requested or rendered; and/or the rendering engine 110 may render the processed mapping data according to the layer prioritization scheme regardless of an order in which the data is processed and/or requested.

Figure 2:
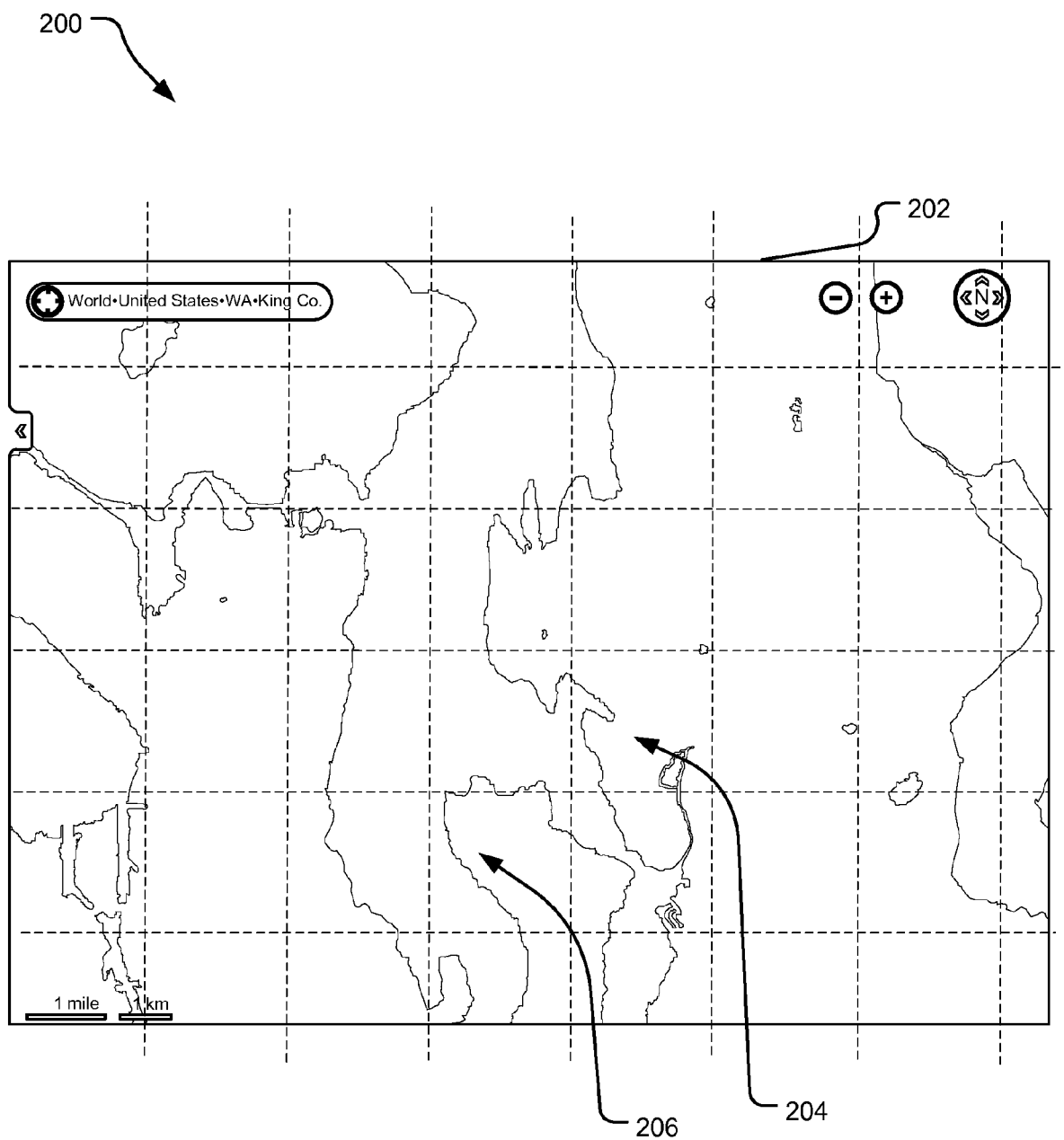
FIG. 2 illustrates a prioritized mapping system rendering layer sets of mapping data to a display.

By example and not limitation, FIGS. 2-5 illustrate progressive rendering of layer sets of mapping layers from a highest to lower priority defined one of many suitable layer prioritization schemes. FIG. 2 illustrates a prioritized mapping system 202 rendering high priority layer sets of mapping data to a display 202. In one implementation, a user provides the prioritized mapping system 200 with input indicating a request for a map of a particular geographical area of interest. For example, the user may type "Seattle" into a search bar of the interactive mapper to initiate a request for a map of the city of Seattle, Wash.

Responsive to the request, the prioritized mapping system 200 identifies data sources for mapping data and prioritizes queries for different layers of mapping data according a layer prioritization scheme. One example layer prioritization scheme prioritizes the following layer sets of mapping data in the following order: (1) water; (2) land; (3) roads; (4) labels; (5) topography. In the following descriptions, individual layer sets of the prioritized layered scheme are referred to as "the first layer set" (e.g., the highest priority layer set), "the second layer set" (e.g., the second highest priority layer set), "the third layer set" (e.g., the third highest priority layer set), etc.

The prioritized mapping system 200 sends requests for data in a general order defined by the layer prioritization scheme. Since "water" is the highest-priority layer set in the illustrated example, the prioritized mapping system generates and transmits requests for water data first. Water data may include, for example, land/water boundaries, rivers, lakes, and graphical colors or shading that the mapping program associates with such features. In some implementations, requests for water data are further prioritized within the layer prioritization scheme so that there exists a defined priority between different types of mapping features (e.g., rivers, lakes, oceans, etc.) of a same general layer set. For example, requests for ocean data may be deliberately transmitted before requests for lake data or vice versa.

In some implementations, data requests are prioritized based on where associated data is to appear in the display 202. For example, individual tiles (e.g., a tile 204) may be prioritized via the layer prioritization scheme so that tiles in certain areas of the display are requested, processed, and/or rendered before tiles in other areas. For example, water data in tile 204 may be requested and rendered before water data of the tile 206.

In one implementation, the prioritized mapping system 200 delays requests pertaining to the different layer sets. For example, requests for data of a second layer set (e.g., land) are delayed until enough data of the first layer set (e.g., water) is received to satisfy a threshold condition, such as receipt of a predefined amount (e.g., 80%) of the data of the first layer set. Upon determining that the data of the most-recently requested data set (e.g., water) satisfies the one or more threshold conditions, the prioritized mapping system 200 begins transmitting data requests pertaining to the second layer set (e.g., land). Land data may include, for example, jurisdictional land boundaries; such as boundaries between cities, and states; and graphical colors that the prioritized mapping system 200 associates with such features.

In at least one implementation, the layer prioritization scheme assigns equal priority to two or more of the layer sets of mapping data. For example, land and water may be prioritized equally. In this case, the prioritized mapping system 200 may initially generate and transmit various requests for land and water in mixed order or with any predetermined priority based on prioritizations of individual mapping features (e.g., subsets) within each layer set, tile location, etc. When a threshold amount of the land and water data is received (e.g., either a threshold amount of each of the individual layer sets or a threshold total amount of the combined the layer sets), the prioritized mapping system 200 begins requesting data of the next layer set (e.g., road data).

In one implementation, the prioritized mapping system 200 processes and renders data to the display 202 according the predefined layer prioritization scheme used for ordering data requests. If requested data is received by the prioritized mapping system 200 in an order contrary to the layer prioritization scheme, processing or rendering of data from certain layer sets is temporarily delayed until data of the higher priority layered sets is processed and rendered first. If, for example, the layer prioritization scheme assigns a higher priority to land than water, the prioritized mapping system 200 may postpone processing and rendering of any water data until substantially all of the requested land data is processed and/or rendered.

Figure 3:
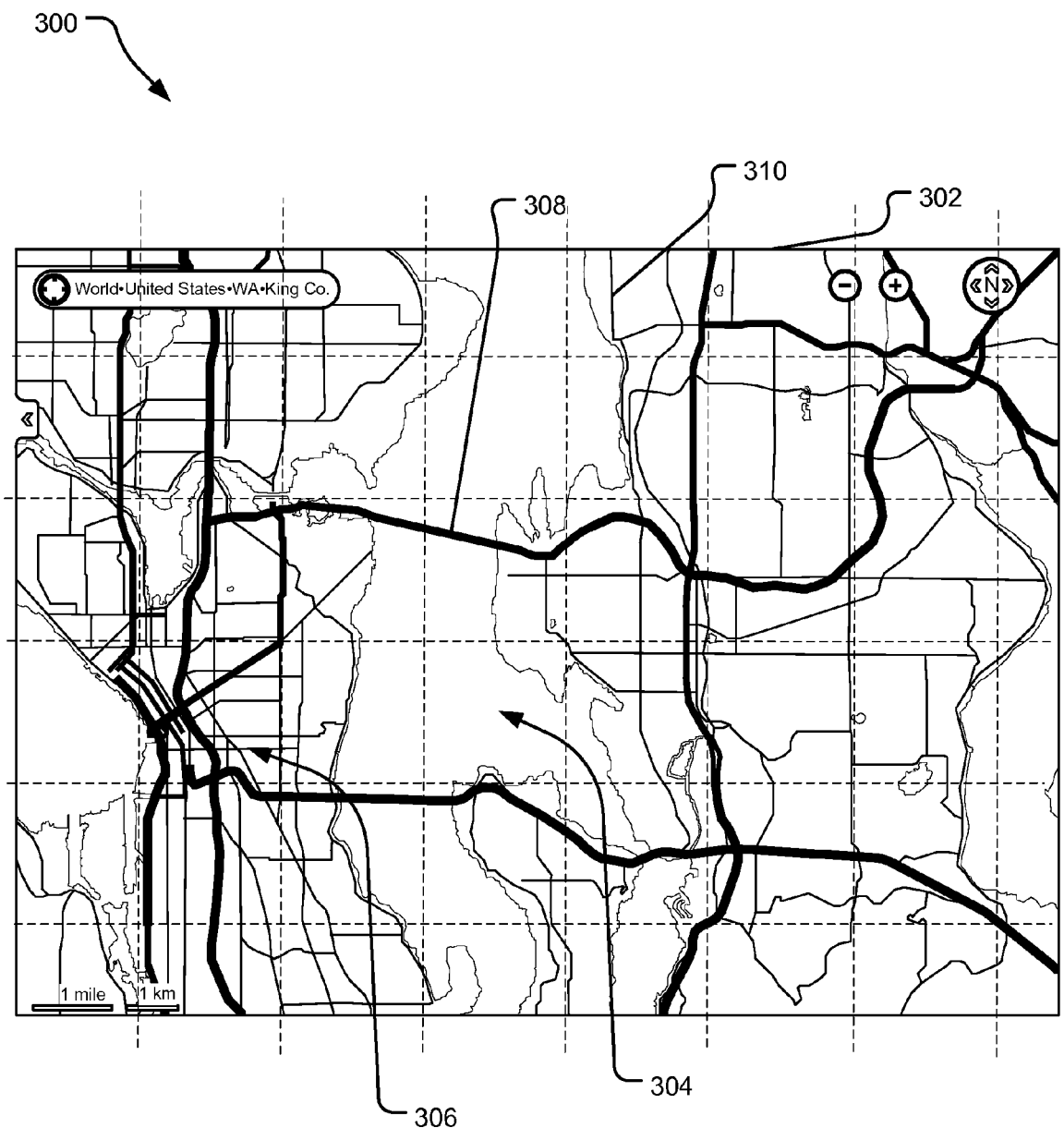
FIG. 3 illustrates a prioritized mapping system rendering additional layer sets of mapping data to a display.

FIG. 3 illustrates a prioritized mapping system 300 rendering medium-high priority layer sets of mapping data to a display 302. The prioritized mapping system 300 implements a prioritized mapping scheme that prioritizes the following layer sets of data in the following order: (1) water; (2) land; (3) roads; (4) labels; and (5) topography. In FIG. 3, mapping features are shown in the display 302 pertaining to land and water in addition to some road data. Specifically, the display 302 depicts major roads (e.g., a major road 310) and major highways (e.g., a major highway 308).

When requesting data for the display 302, the prioritized mapping system 300 delays groupings of requests pertaining to each of the different layer sets until enough data of a most recently requested layer set is received to satisfy a threshold condition. For example, the prioritized mapping system 300 may begin to transmit requests for road data after the prioritized mapping system 300 confirms receipt of a threshold amount of the land data. In one implementation, requests for major road data are transmitted responsive to a determination that 80% of all requested land data has been received.

Figure 4:
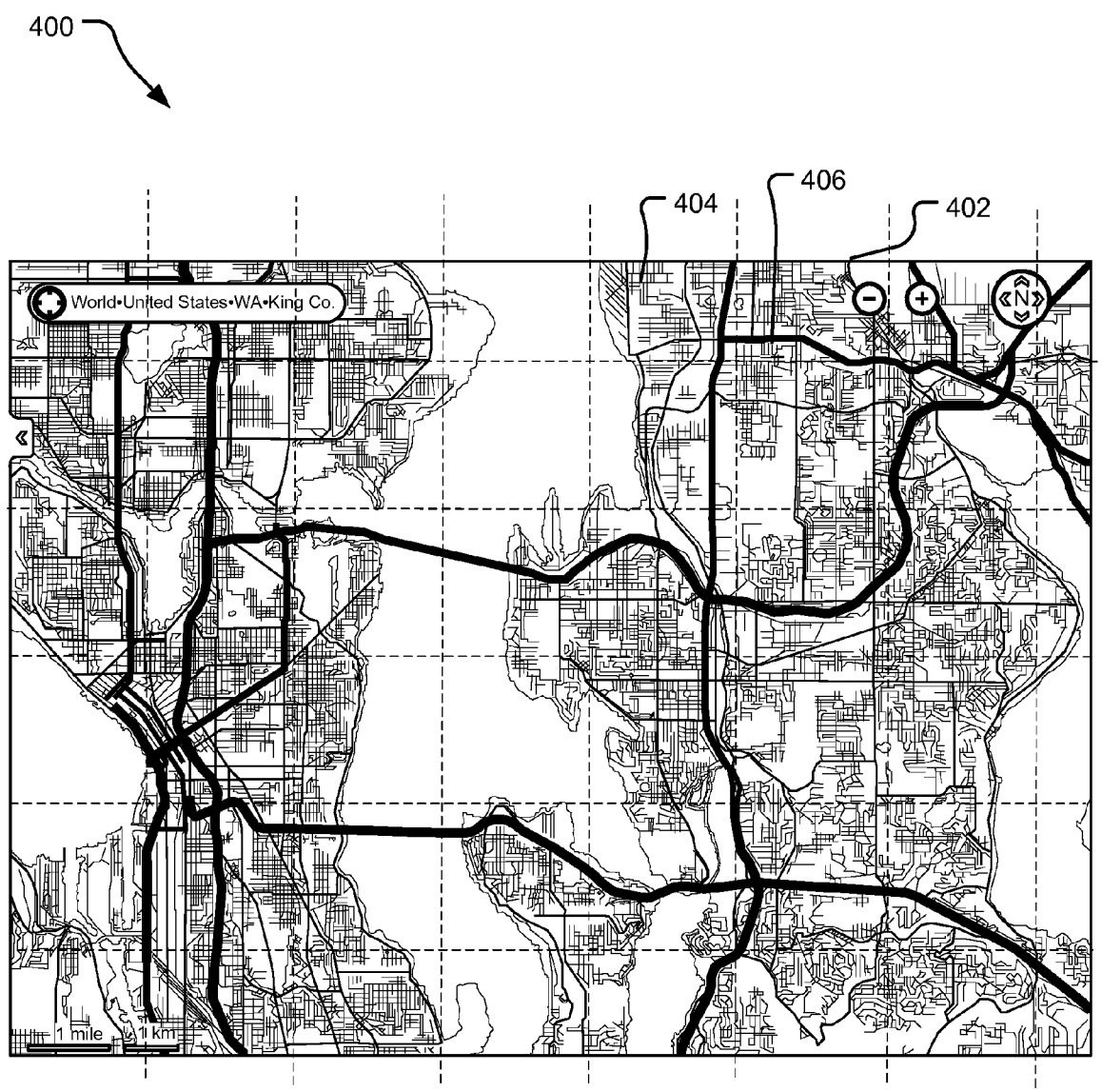
FIG. 4 illustrates a prioritized mapping system rendering still additional layer sets of mapping data to a display.

In the illustrated example, subsets of layer sets are further prioritized within the layer prioritization scheme so that major roads are prioritized higher than minor roads (note, major roads and highways are shown in FIG. 3; minor roads are shown in FIG. 4).

Data is rendered to the display 302 according to the same layer prioritization scheme that dictates ordering of the outgoing data requests. For example, water data is processed and rendered before land data, and land data is processed and rendered before road data. After substantially all of the land data is rendered to the display 302, the prioritized mapping system 300 begins processing and rendering "major highways" (e.g., the first subset of the "road data" layer set).

In some implementations, all road data (e.g., major roads, minor roads, paths, etc.) is prioritized equally by the layer prioritization scheme. In other implementations, road data is prioritized according to one or more defined subsets in addition to or in lieu of "major roads" and "minor roads." For example, road data may be prioritized according to subsets such as interstates, highways, paved roads, dirt roads, pedestrian paths, etc. The various subsets of the road data layer set may be requested and rendered consecutively (e.g., progressively rendering all different classifications of road data) or non-consecutively. For example, labels for major cities may be rendered after requests for major road but before requests for minor road data. In other implementations, tiles containing prominent road junctions are prioritized higher than tiles that do not contain road junctions. For example, road data for the tile 306 may be requested and/or rendered before road data for the tile 304.

FIG. 4 illustrates a prioritized mapping system 400 rendering medium priority layer sets of mapping data to a display 402. The prioritized mapping system 400 implements a prioritized mapping scheme that prioritizes the following layer sets of data in the following order: (1) water; (2) land; (3) roads; (4) labels; and (5) topography. In FIG. 4, mapping features are shown in the display 402 pertaining to each of water, land, and "major roads," (e.g., a first subset of the "roads" layer set). "Major roads" include, for example, a highway 406. In addition,
The display 402 depicts "minor roads" (e.g., a second subset of the "roads" layer set). Minor roads include, for example, a filigree road 404.

The prioritized mapping system 400 requests the mapping data pertaining to minor roads responsive to a determination that enough data of a most recently requested layer set (or subset) is received to satisfy a threshold condition. For example, the prioritized mapping system 400 may begin to transmit requests for minor road data after the prioritized mapping system 400 confirms receipt of a predetermined amount of the major road data.

Data is rendered to the display 402 according to the same prioritized mapping scheme that dictates ordering of the outgoing data requests. After substantially all of the major road data is rendered to the display 402, the prioritized mapping system 400 begins processing and rendering the minor road data.

Figure 5:
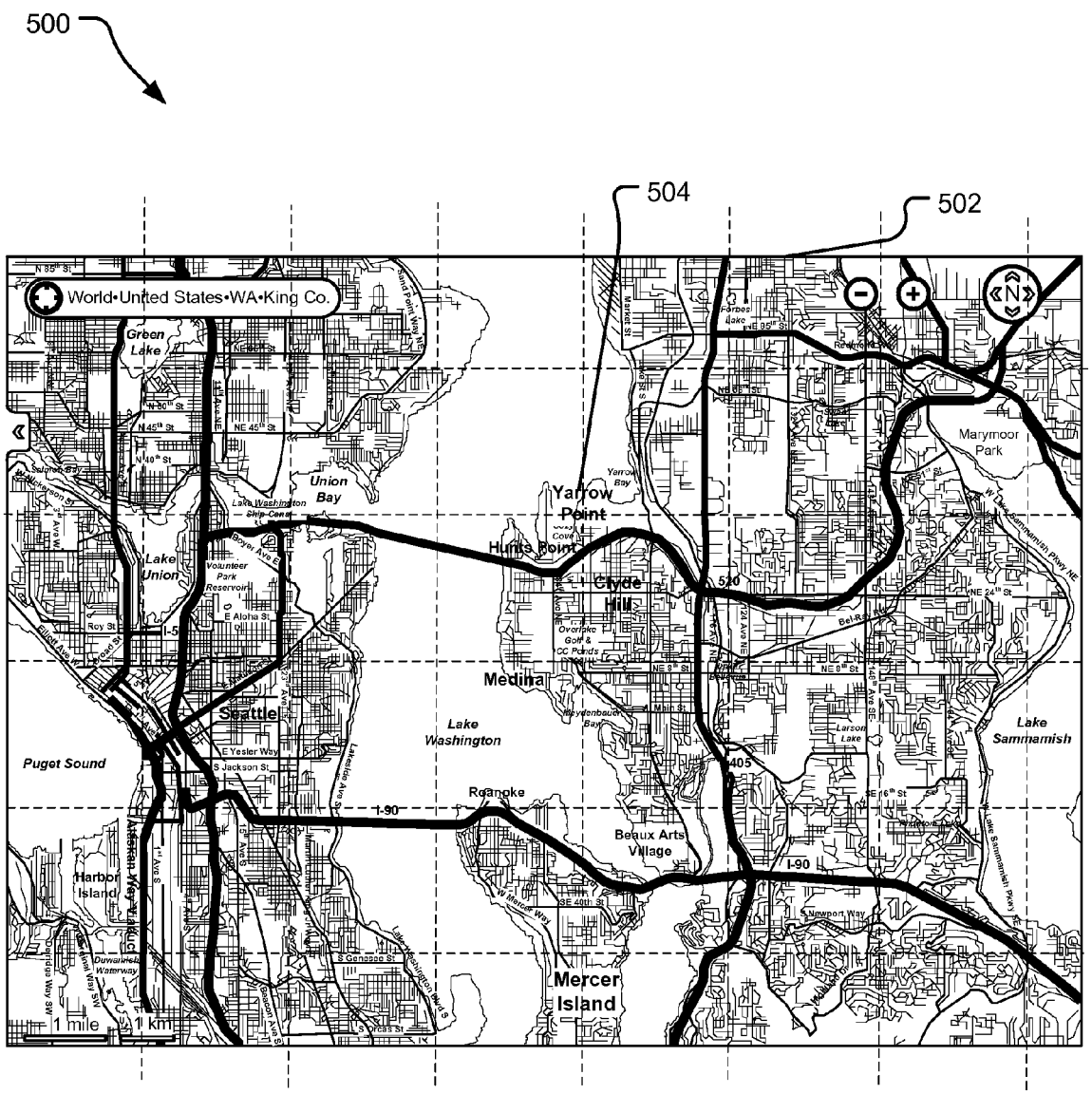
FIG. 5 illustrates a prioritized mapping system rendering further additional layer sets of mapping data to a display.

FIG. 5 illustrates a prioritized mapping system 500 rendering medium-low priority layer sets of mapping data to a display 502. The prioritized mapping system 500 implements a prioritized mapping scheme that prioritizes the following layer sets of data in the following order: (1) water; (2) land; (3) roads; (4) labels; and (5) topography. In FIG. 5, mapping features are shown in the display 502 pertaining to each of water, land, and roads. In addition, the display 502 includes textual labels (e.g., a label 504), such as labels identifying various roads, cities, states, bodies of water, etc.

The prioritized mapping system 500 requests mapping data for "labels" responsive to a determination that that enough of the most recently requested layer set or subset (e.g., minor roads) is received to satisfy a threshold condition. For example, the prioritized mapping system 500 may begin to transmit requests for labels after the prioritized mapping system 500 confirms receipt of a predetermined portion of the requested minor road data.

Data is rendered to the display 502 according to the same prioritized mapping scheme that dictates ordering of the outgoing data requests. After substantially all of the minor road data is rendered to the display 502, the prioritized mapping system 500 begins processing and rendering the label data.

In one implementation, the layer prioritization scheme prioritizes different subsets of labels. For example, the layer prioritization scheme may assign a higher priority to labels of larger bodies or municipalities (e.g., oceans, countries, states) and assign a lower priority to smaller bodies and municipalities (e.g., cities, towns, rivers, parks, etc.). In one implementation, the layer prioritization scheme provides for progressively requesting and rendering of labels in descending order of a predetermined relative "importance."

Figure 6:
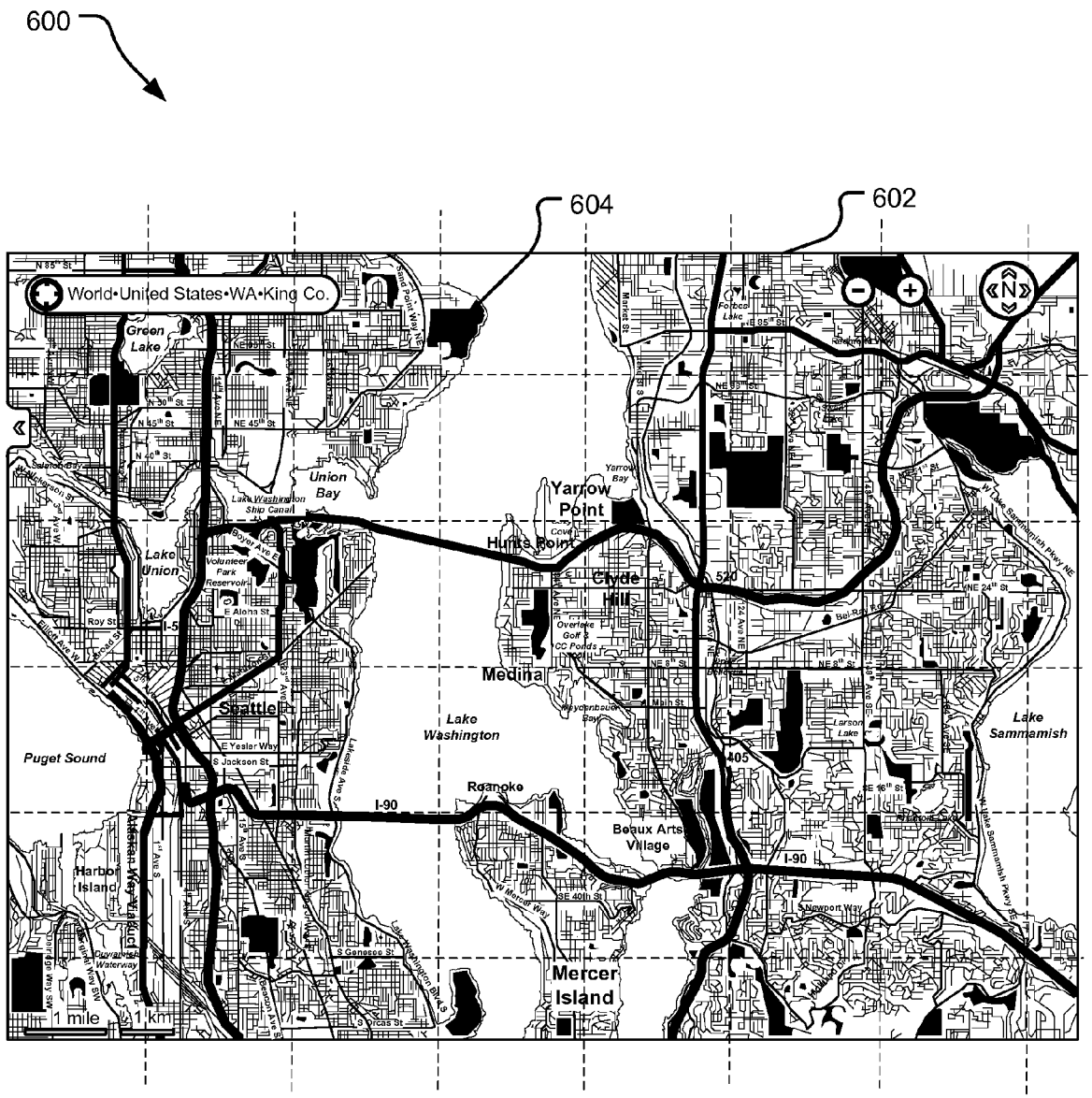
FIG. 6 illustrates a prioritized mapping system rendering yet further additional layer sets of mapping data to a display.

FIG. 6 illustrates a prioritized mapping system 600 rendering low-priority layer sets of mapping data to a display 602. The prioritized mapping system 600 implements a prioritized mapping scheme that prioritizes the following layer sets of data in the following order: (1) water; (2) land; (3) roads; (4) labels; and (5) topography. In FIG. 6, mapping features are shown in the display 602 pertaining to each of water, land, roads, and labels. In addition, the display 602 further depicts topography (e.g., a hill-shaded area 604).

The prioritized mapping system 600 requests topography data responsive to a determination that enough data of the most recently requested layer set (e.g., labels) is received to satisfy a threshold condition. For example, the prioritized mapping system 600 may begin to transmit requests for topography after the prioritized mapping system 600 confirms receipt of some predetermined amount of the requested label data.

After substantially all of the label data is rendered to the display 602, the prioritized mapping system 600 begins processing and rendering the topography data. In some cases, topography data is retrieved in the form of large satellite images. If so, retrieving, processing, and/or rendering topography data to the display 602 may take more time than some of the other, higher-priority layer sets. Regardless, the above-described layer prioritization scheme increases a likelihood that data already rendered to the display 602 is more important to the user than the topography data. If so, the end user may benefit from viewing the already-displayed data while the topography data is still being requested and/or rendered. In other words, progressive rendering of layers in the above-described manner reduces an apparent wait time between initiation of a mapping request and presentation of useful data to a user.

In different implementations, the layer prioritization scheme is tailored to different users and different purposes served by the prioritized mapping system 600.

Figure 7:
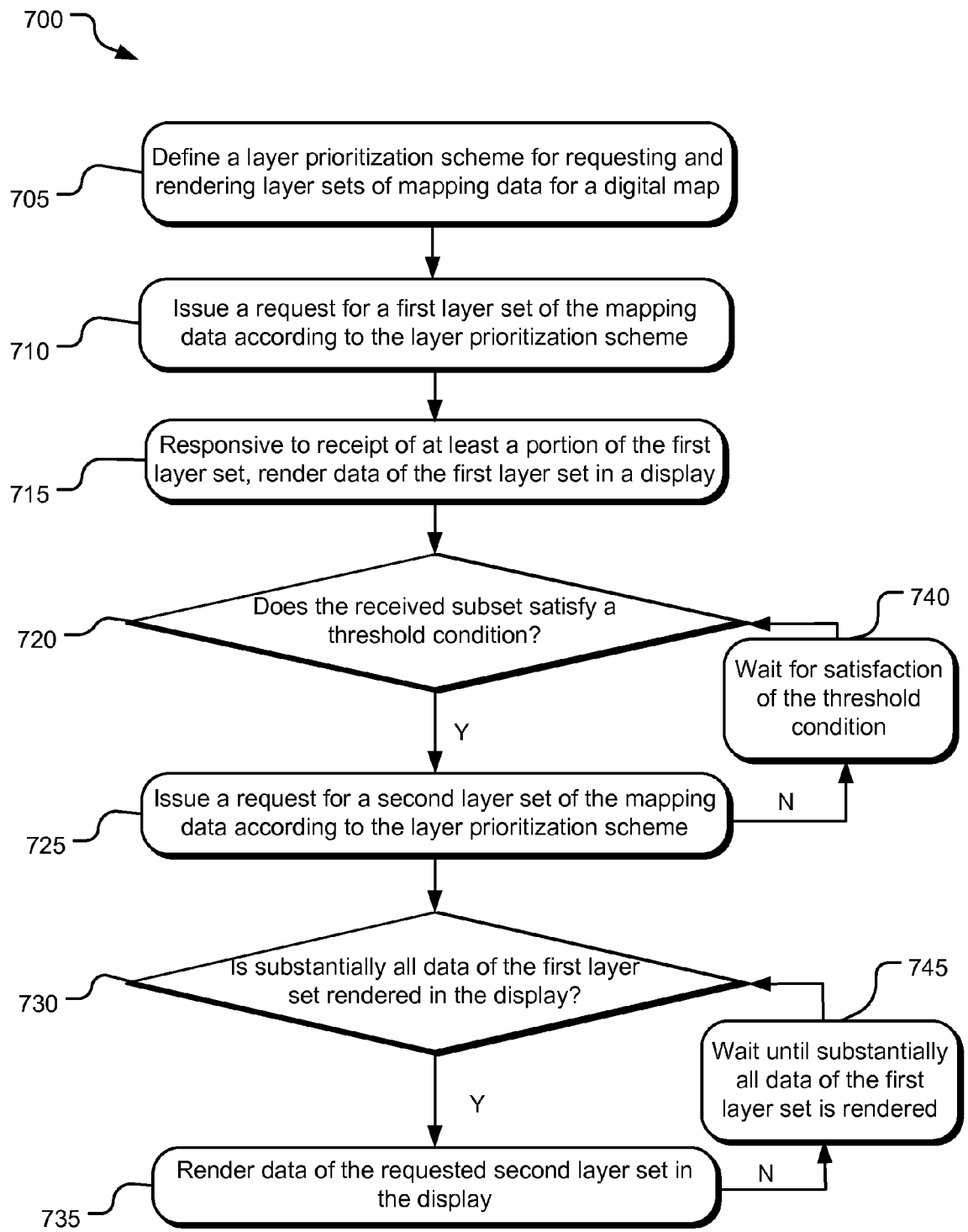
FIG. 7 illustrates example operations for rendering mapping data to a display according to a predefined layer prioritization scheme.

FIG. 7 illustrates example operations 700 for rendering mapping data to a display according to a predefined layer prioritization scheme. A defining operation 705 defines a layer prioritization scheme that prioritizes different layer sets of the mapping data for a digital map. A requesting operation 710 issues a request for a first layer set with a first, pre-defined priority according to the layer prioritization scheme. After at least a portion of data of the first layer set is received, a rendering operation 715 begins rendering the received data to a display.

A determining operation 720 determines whether a received subset of the first layer set satisfies a threshold condition. For example, the threshold condition may be satisfied when the subset includes a predetermined quantity of the requested data of the first layer set. If the received subset of the first layer set does not satisfy the threshold condition, a waiting operation 740 waits for satisfaction of the threshold condition.

If the received subset of the first layer does satisfy the threshold condition, another requesting operation 725 issues a request for mapping data of a second layer set with a priority immediately following the first layer set in the layer prioritization scheme. Another determination operation 730 determines whether substantially all data (e.g., 100%+/−5%) of the first layer set has been rendered in the display. If less than substantially all of the data of the first data set has been rendered, a waiting operation 745 waits until substantially of the data of the first layer set has been rendered. After substantially all of the data of the first layer set is rendered, a rendering operation 735 renders the data of the second data set.

Figure 8:
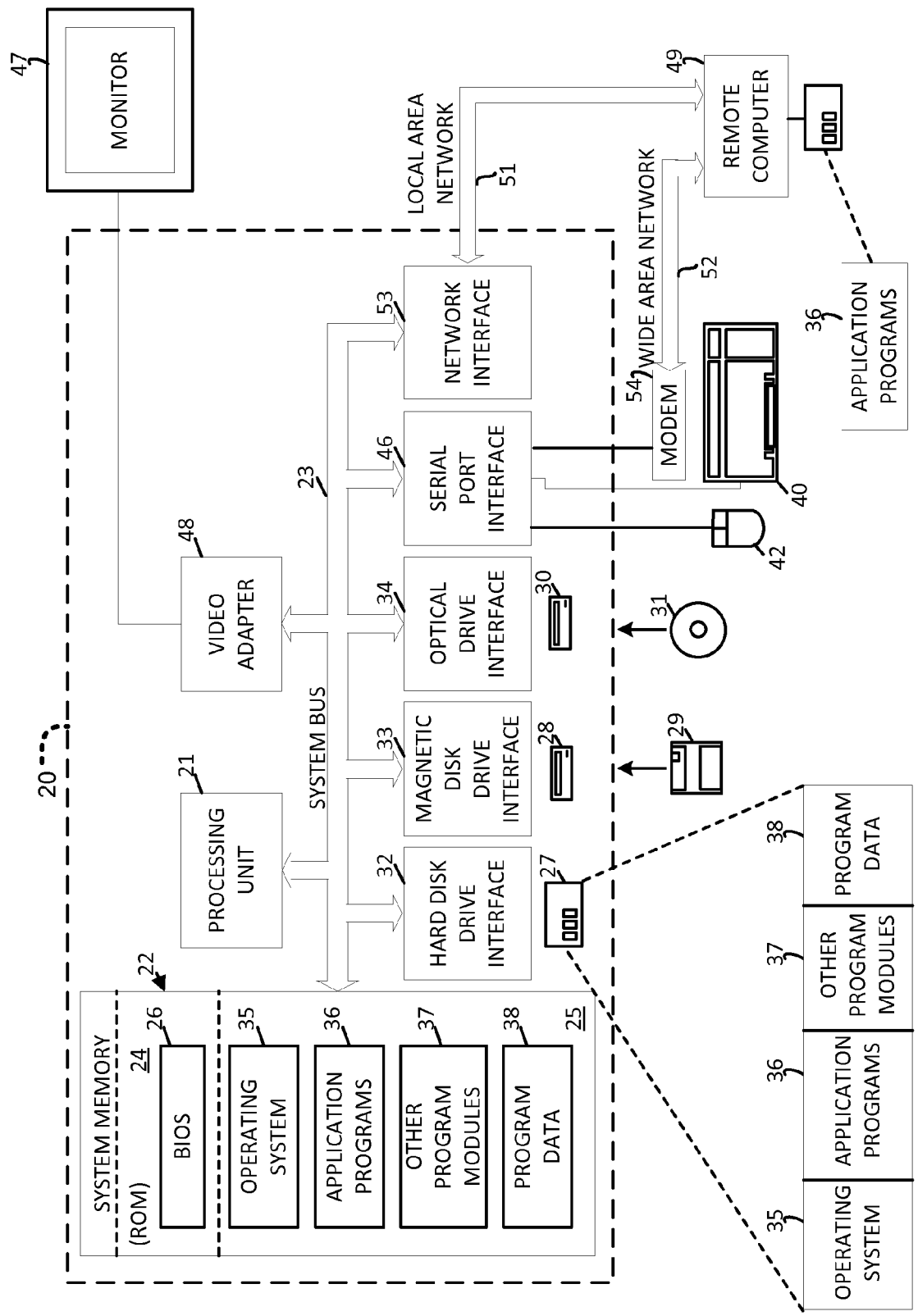
FIG. 8 illustrates an example system that may be useful in implementing the described technology.

FIG. 8 illustrates an example system that may be useful in implementing the described technology. The example hardware and operating environment of FIG. 8 for implementing the described technology includes a computing device, such as a general purpose computing device in the form of a computer 20, a mobile telephone, a personal data assistant (PDA), a tablet, smart watch, gaming remote, or other type of computing device. In the implementation of FIG. 7, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software or firmware instructions for requesting, processing, and rendering mapping data may be stored in memory 22 and/or storage devices 29 or 31 and processed by the processing unit 21. Mapping data and/or layer prioritization scheme data may be stored in memory 22 and/or storage devices 29 or 31 as persistent datastores.

Figure 9:
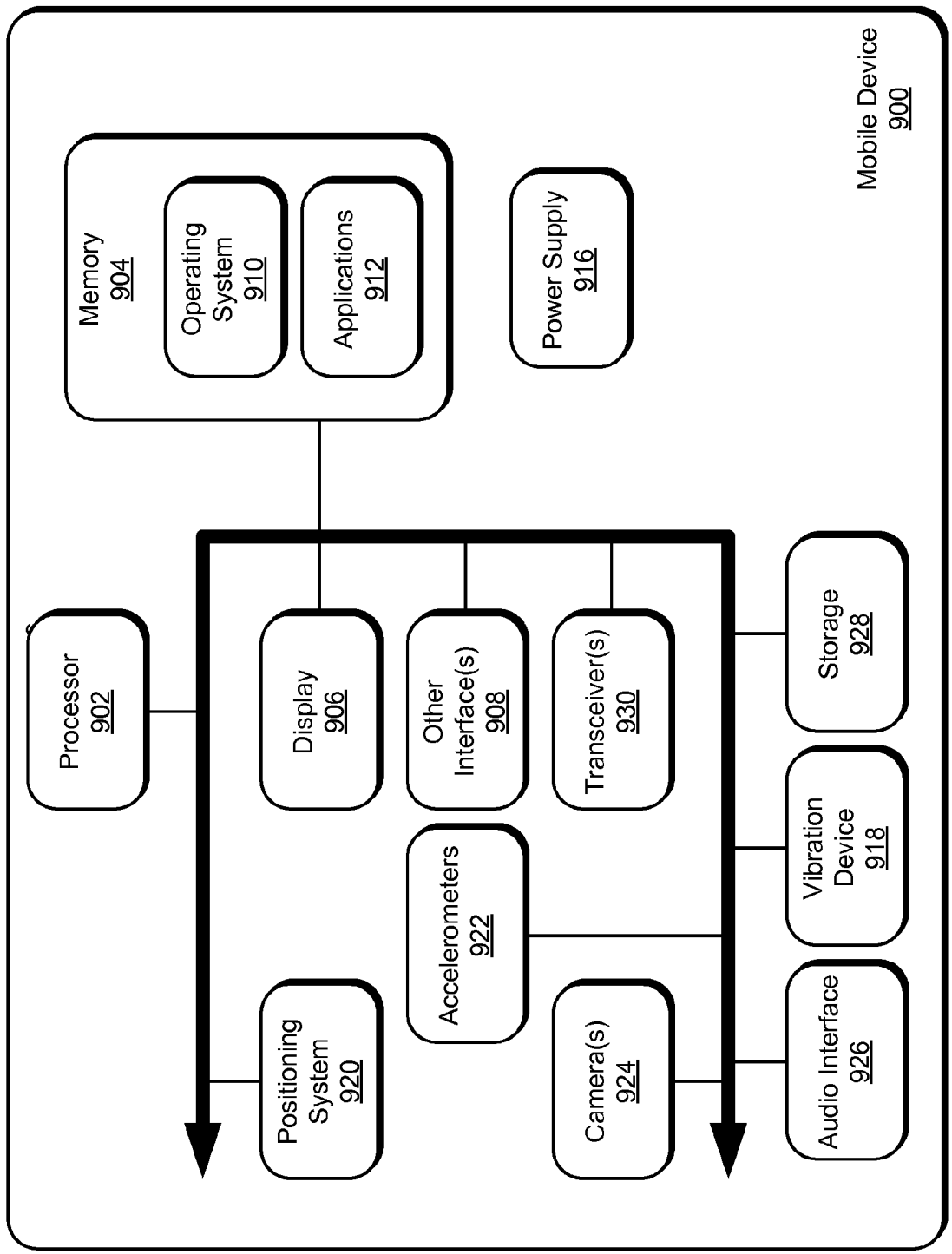
FIG. 9 illustrates another example system that may be useful in implementing the described technology.

FIG. 9 illustrates another example system (labeled as a mobile device 900) that may be useful in implementing the described technology. The mobile device 900 includes a processor 902, a memory 904, a display 906 (e.g., a touch-screen display), and other interfaces 908 (e.g., a keyboard). The memory 904 generally includes both volatile memory (e.g., RAM) and non-volatile memory (e.g., flash memory). An operating system 910, such as the Microsoft Windows® Phone operating system, resides in the memory 904 and is executed by the processor 902, although it should be understood that other operating systems may be employed.

One or more application programs 912 are loaded in the memory 904 and executed on the operating system 910 by the processor 902. Examples of applications 912 include without limitation a rendering engine, a prioritized requestor, a prioritized processor, etc. The mobile device 900 includes a power supply 916, which is powered by one or more batteries or other power sources and which provides power to other components of the mobile device 900. The power supply 916 may also be connected to an external power source that overrides or recharges the built-in batteries or other power sources.

The mobile device 900 includes one or more communication transceivers 930 to provide network connectivity (e.g., mobile phone network, Wi-Fi®, BlueTooth®, etc.). The mobile device 900 also includes various other components, such as a positioning system 920 (e.g., a global positioning satellite transceiver), one or more accelerometers 922, one or more cameras 924, an audio interface 926 (e.g., a microphone, an audio amplifier and speaker and/or audio jack), and additional storage 928. Other configurations may also be employed.

In an example implementation, a prioritized requestor, prioritized processor, rendering engine, and other modules may be embodied by instructions stored in memory 904 and/or storage devices 928 and processed by the processing unit 902. Mapping data may be stored in memory 904 and/or storage devices 928 as persistent datastores.

Mobile device 900 and computer 20 (of FIG. 9) may include a variety of tangible computer-readable storage media and intangible computer-readable communication signals. Tangible computer-readable storage can be embodied by any available media that can be accessed by the mobile device 900 or the computer 20 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device 900 or computer 20.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example system includes memory, one or more processor units, a requestor stored in the memory and executable by the one or more processor units. The requestor is configured to transmit requests for different layer sets of mapping data for a digital map according to a predefined order.

Another example system of any preceding system further includes a rendering engine stored in the memory and executable by the one or more processor units. The rendering engine is configured to progressively render different layer sets of mapping data for a digital map according to a predefined order.

In another example system of any preceding system, the requestor is further configured to transmit an initial request for data of each one of the different layer sets responsive to receipt of a subset of a most recently requested one of the different layers sets, if the received subset satisfies a threshold condition.

In another example system of any preceding system, the threshold condition is satisfied when a predetermined amount of data of the most recently-requested one of the different layer sets is received.

Another example system of any preceding system further includes a processor stored in the memory and executable by the one or more processor units. The processor is configured to process data of the different layer sets of mapping data according to the predefined order.

In another example system of any preceding system, the predefined order prioritizes different subsets of mapping features within at least one of the different layer sets.

In another example system of any preceding system, the predefined order further prioritizes data of each of the different layer sets based on corresponding display areas of the digital map.

An example method includes defining an order for requesting and rendering layer sets of mapping data for a digital map, issuing a request for a first layer set of the layer sets of the mapping data for the digital map according to the predefined order, and rendering the first layer set in a display of the digital map as at least a portion of the first layer set is received. Responsive to receipt of a subset of the requested first layer set that satisfies a threshold condition, the method includes issuing a request for a second layer set of the layer sets of the mapping data according to the predefined order. The method further includes rendering the requested second layer set in the display of the digital map after the requested first layer set has been rendered in the display of the digital map.

Another example method of any preceding method further includes defining an order for rendering different mapping feature subsets of the first layer set and rendering the different mapping feature subsets of the first layer in the defined order.

Another example method of any preceding method further includes defining an order for rendering tiles of at least one of the layer sets, each tile representing a different display area of the digital map and rendering the tiles of the at least one of the layer sets according to the defined order.

In another example method of any preceding method, the first layer set includes data from a first data source and the second layer set includes data a second different data source.

In another example method of any preceding method, the first layer set includes vector data and the second layer set includes image data.

In another example method of any preceding method, the threshold condition is satisfied once substantially all data of the first requested layer set is received.

In another example method of any preceding method, the threshold condition is satisfied once a predefined amount of data of the first requested layer set is received.

Another example method of any preceding method further includes issuing a request for a third layer set of the layer sets of the mapping data for the digital map according to the predefined order after the second layer set has been rendered in the display of the digital map and rendering the third layer set in a display of the digital map as at least a portion of the third layer set is received. Responsive to receipt of a subset of the requested third layer set that satisfies a threshold condition, the method further includes issuing a request for a fourth layer set of the layer sets of the mapping data according to the predefined order. The method further includes rendering the requested fourth layer set in the display of the digital map after the requested third layer set has been rendered in the display of the digital map.

In another example method of any preceding method, the predefined order further prioritizes subsets of mapping features within at least one of the different layer sets for the digital map.

In another example method of any preceding method, the predefined order further prioritizes data of each of the different layer sets based on corresponding display areas of the digital map.

Another example system includes memory, one or more processor units, and a requestor stored in the memory and executable by the one or more processor units. The requestor is configured to transmit requests for different layer sets of mapping data for a digital map according to a predefined order. A processor is stored in the memory and is executable by the one or more processor units. The processor is configured to process data of the different layer sets according to the predefined order regardless of an order in which the data of the different layer sets is received. A rendering engine is stored in memory and is executable by at least one processor. The rendering engine is configured to progressively render each one of the different layer sets of mapping data to the digital map according to the predefined order so that each layer set is rendered after all of the different layer sets of higher order in the predefined order are rendered.

In another example system of any preceding system, the requestor is further configured to delay requests pertaining to each of the different layer sets based on one or more threshold conditions.

In another example system of any preceding system, the threshold condition is satisfied when a predetermined amount of data of the most recently-requested one of the layer sets is received.

Another example system includes means for defining an order for requesting and rendering layer sets of mapping data for a digital map, means for issuing a request for a first layer set of the layer sets of the mapping data for the digital map according to the predefined order, and means for rendering the first layer set in a display of the digital map as at least a portion of the first layer set is received. Responsive to receipt of a subset of the requested first layer set that satisfies a threshold condition, the includes means for issuing a request for a second layer set of the layer sets of the mapping data according to the predefined order. The method further includes means for rendering the requested second layer set in the display of the digital map after the requested first layer set has been rendered in the display of the digital map.

Another example system of any preceding system further includes means for defining an order for rendering different mapping feature subsets of the first layer set and means for rendering the different mapping feature subsets of the first layer in the defined order.

Another example system of any preceding system further includes means for defining an order for rendering tiles of at least one of the layer sets. Each tile represents a different display area of the digital map. The example system further includes means for rendering the tiles of the at least one of the layer sets according to the defined order.

In another example system of any preceding system, the first layer set includes data from a first data source and the second layer set includes data a second different data source.

In another example system of any preceding system, the first layer set includes vector data and the second layer set includes image data.

In another example system of any preceding system, the threshold condition is satisfied once substantially all data of the first requested layer set is received.

In another example system of any preceding system, the threshold condition is satisfied once a predefined amount of data of the first requested layer set is received.

Another example system of any preceding system further includes means for issuing a request for a third layer set of the layer sets of the mapping data for the digital map according to the predefined order after the second layer set has been rendered in the display of the digital map and means for rendering the third layer set in a display of the digital map as at least a portion of the third layer set is received. Responsive to receipt of a subset of the requested third layer set that satisfies a threshold condition, the system further includes means for issuing a request for a fourth layer set of the layer sets of the mapping data according to the predefined order. The system further includes means for rendering the requested fourth layer set in the display of the digital map after the requested third layer set has been rendered in the display of the digital map.

Another example system of any preceding system further includes the means for prioritizing subsets of mapping features within at least one of the different layer sets for the digital map.

Another example system of any preceding system further includes means for prioritizing data of each of the different layer sets based on corresponding display areas of the digital map.

The implementations of the embodiments described herein are implemented as logical steps in one or more computer systems. The logical operations of the disclosed embodiments are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed embodiments. Accordingly, the logical operations making up the disclosed embodiments described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary implementations. Since many alternative implementations can be made without departing from the spirit and scope of what is disclosed, the invention resides in the claims hereinafter appended. Furthermore, structural features of the different implementations may be combined without departing from the recited claims.

What is claimed is:

1. A system comprising:
   memory;
   one or more processor units;
   a requestor stored in the memory and executable by the one or more processor units, the requestor configured to transmit requests for different layer sets of mapping data for a digital map according to a predefined order, each transmitted request specifying at least one of the layer sets, each one of the layer sets including layer data overlapping layer data of another one of the layer sets.

2. The system of claim 1, further comprising:
   a rendering engine stored in the memory and executable by the one or more processor units, the rendering engine configured to progressively render different layer sets of mapping data for a digital map according to the predefined order.

3. The system of claim 1, wherein the requestor is further configured to transmit an initial request for data of each one of the different layer sets responsive to receipt of a subset of a most recently requested one of the different layers sets, the received subset satisfying a threshold condition.

4. The system of claim 3, wherein the threshold condition is satisfied when a predetermined amount of data of the most recently-requested one of the different layer sets is received.

5. The system of claim 1, further comprising:
   a processor stored in the memory and executable by the one or more processor units, the processor configured to process data of the different layer sets of mapping data according to the predefined order.

6. The system of claim 1, wherein the predefined order prioritizes different subsets of mapping features within at least one of the different layer sets.

7. The system of claim 1, wherein the predefined order further prioritizes data of each of the different layer sets based on corresponding display areas of the digital map.

8. The system of claim 1, further comprising:
   a rendering engine stored in the memory and executable by the one or more processor units, the rendering engine configured to begin rendering at least one of the different layer sets to a display before at least one of the different layer sets is requested.

9. A method comprising:
   defining an order for requesting and rendering layer sets of mapping data for a digital map, the layer sets including a first layer set and a second layer set, the first layer set including layer data overlapping layer data of the second layer set;
   issuing a request with a processor for the first layer set of the layer sets of the mapping data for the digital map according to the predefined order;
   rendering the first layer set in a display of the digital map as at least a portion of the first layer set is received;
   responsive to receipt of a subset of the requested first layer set that satisfies a threshold condition, issuing a request with the processor for the second layer set of the layer sets of the mapping data according to the predefined order; and
   rendering the requested second layer set in the display of the digital map after the requested first layer set has been rendered in the display of the digital map.

10. The method of claim 9, further comprising:
    defining an order for rendering different mapping feature subsets of the first layer set; and
    rendering the different mapping feature subsets of the first layer in the defined order.

11. The method of claim 9, further comprising:
    defining an order for rendering tiles of at least one of the layer sets, each tile representing a different display area of the digital map; and
    rendering the tiles of the at least one of the layer sets according to the defined order.

12. The method of claim 9, wherein the first layer set includes data from a first data source and the second layer set includes data from a second different data source.

13. The method of claim 9, wherein the first layer set includes vector data and the second layer set includes image data.

14. The method of claim 9, wherein the threshold condition is satisfied once substantially all data of the first requested layer set is received.

15. The method of claim 9, wherein the threshold condition is satisfied once a predefined amount of data of the first requested layer set is received.

16. The method of claim 9 further comprising:
    issuing a request for a third layer set of the layer sets of the mapping data for the digital map according to the predefined order after the second layer set has been rendered in the display of the digital map;
    rendering the third layer set in a display of the digital map as at least a portion of the third layer set is received;
    responsive to receipt of a subset of the requested third layer set that satisfies a threshold condition, issuing a request for a fourth layer set of the layer sets of the mapping data according to the predefined order; and
    rendering the requested fourth layer set in the display of the digital map after the requested third layer set has been rendered in the display of the digital map.

17. The method of claim 9, wherein the predefined order further prioritizes subsets of mapping features within at least one of the different layer sets for the digital map.

18. The method of claim 9, wherein the predefined order further prioritizes data of each of the different layer sets based on corresponding display areas of the digital map.

19. The method of claim 9, further comprising:
    issuing a request for at least one layer set of the layer sets of the mapping data for the digital map according to the predefined order after at least one other layer set has been rendered in the display of the digital map.

20. A system comprising:
memory;
one or more processor units;
a requestor stored in the memory and executable by the one or more processor units, the requestor configured to transmit requests for different layer sets of mapping data for a digital map according to a predefined order, each transmitted request specifying at least one of the layer sets, each one of the layer sets including layer data overlapping layer data of another one of the layer sets;
a processor stored in the memory and executable by the one or more processor units, the processor configured to process data of the different layer sets according to the predefined order regardless of an order in which the data of the different layer sets is received; and
a rendering engine stored in memory and executable by at least one processor, the rendering engine configured to progressively render each one of the different layer sets of mapping data to the digital map according to the predefined order so that each layer set is rendered after all of the different layer sets of higher order in the predefined order are rendered.

21. The system of claim 20, wherein the requestor is further configured to delay requests pertaining to each of the different layer sets based on one or more threshold conditions.

22. The system of claim 21, wherein the one or more threshold conditions include a threshold condition that is satisfied when a predetermined amount of data of the most recently-requested one of the layer sets is received.

23. The system of claim 20, wherein the rendering engine is further configured to begin rendering at least one of the different layer sets to a display before at least one of the different layer sets is requested.

* * * * *